(12) United States Patent
Cheung et al.

(10) Patent No.: US 8,729,326 B2
(45) Date of Patent: *May 20, 2014

(54) SELECTIVE HYDROGENATION CATALYST AND METHODS OF MAKING AND USING SAME

(75) Inventors: Tin-Tack Peter Cheung, Kingwood, TX (US); Joseph Bergmeister, III, Kingwood, TX (US); Zongxuan Hong, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 1113 days.

This patent is subject to a terminal disclaimer.

(21) Appl. No.: 12/191,899

(22) Filed: Aug. 14, 2008

(65) Prior Publication Data

US 2008/0300436 A1    Dec. 4, 2008

Related U.S. Application Data

(62) Division of application No. 11/458,937, filed on Jul. 20, 2006, now Pat. No. 7,417,007.

(60) Provisional application No. 60/702,745, filed on Jul. 27, 2005.

(51) Int. Cl.
*C07C 7/163* (2006.01)
*B01J 27/13* (2006.01)

(52) U.S. Cl.
USPC ............ 585/260; 585/258; 585/259; 502/230

(58) Field of Classification Search
USPC ......... 585/250, 258, 259, 271, 273, 275, 277, 585/260; 502/330, 302
See application file for complete search history.

(56) References Cited

U.S. PATENT DOCUMENTS 2,479,109 A * 8/1949 Haensel .................. 502/230
(Continued)

FOREIGN PATENT DOCUMENTS

CN    101267884 A    9/2008
(Continued)

OTHER PUBLICATIONS

Mohundro, "Overview on C2 and C3 selective Hydrogenation in Ethylene Plants" presented at 15th Ethylene Producers Conference, 2003 AIChE National Meeting, Apr. 2003.*

(Continued)

*Primary Examiner* — In Suk Bullock
*Assistant Examiner* — Bradley Etherton
(74) *Attorney, Agent, or Firm* — Rodney B. Carroll; Lynda S. Jolly

(57) ABSTRACT

A method for producing a selective hydrogenation catalyst for hydrogenating a highly unsaturated hydrocarbon to an unsaturated hydrocarbon comprising contacting an inorganic catalyst support with a chlorine-containing compound to form a chlorided catalyst support and adding palladium to the chlorided catalyst support to form a supported-palladium composition. A selective hydrogenation catalyst for hydrogenating a highly unsaturated hydrocarbon to an unsaturated hydrocarbon formed by the method comprising contacting an inorganic catalyst support with a chlorine-containing compound to form a chlorided catalyst support and adding palladium to the chlorided catalyst support to form a supported-palladium composition. A method of selectively hydrogenating a highly unsaturated hydrocarbon to an unsaturated hydrocarbon comprising contacting the highly unsaturated hydrocarbon with a selective hydrogenation catalyst composition produced by contacting an inorganic catalyst support with a chlorine-containing compound to form a chlorided catalyst support and adding palladium to the chlorided catalyst support to form a supported-palladium composition.

23 Claims, 3 Drawing Sheets

(56) References Cited

U.S. PATENT DOCUMENTS

| | | | |
|---|---|---|---|
| 2,802,889 A | 8/1957 | Frevel et al. | |
| 3,325,556 A | 6/1967 | De Rosset | |
| 3,422,001 A * | 1/1969 | Kouwenhoven et al. | 208/143 |
| 3,477,962 A | 11/1969 | Kardys | |
| 3,639,227 A * | 2/1972 | Jacobson et al. | 208/143 |
| 3,651,167 A | 3/1972 | De Rosset et al. | |
| 3,666,412 A | 5/1972 | Sowards | |
| 3,679,762 A | 7/1972 | La Hue et al. | |
| 3,699,056 A * | 10/1972 | Takase et al. | 502/60 |
| 3,718,578 A * | 2/1973 | Buss et al. | 208/139 |
| 3,755,488 A | 8/1973 | Johnson et al. | |
| 3,816,299 A * | 6/1974 | Mears | 208/143 |
| 3,948,808 A | 4/1976 | Box, Jr. et al. | |
| 3,957,688 A | 5/1976 | Farha, Jr. et al. | |
| 4,112,007 A | 9/1978 | Sanfilippo et al. | |
| 4,113,970 A | 9/1978 | Tanabe et al. | |
| 4,128,595 A | 12/1978 | Montgomery | |
| 4,191,846 A | 3/1980 | Farha, Jr. et al. | |
| 4,227,025 A | 10/1980 | Montgomery | |
| 4,347,392 A | 8/1982 | Cosyns et al. | |
| 4,404,124 A | 9/1983 | Johnson et al. | |
| 4,484,015 A | 11/1984 | Johnson et al. | |
| 4,490,481 A | 12/1984 | Boitiaux et al. | |
| 4,571,442 A | 2/1986 | Cosyns et al. | |
| 4,762,956 A | 8/1988 | Liu et al. | |
| 4,906,800 A | 3/1990 | Henry et al. | |
| 5,059,731 A | 10/1991 | Berrebi | |
| 5,059,732 A | 10/1991 | Cosyns et al. | |
| 5,413,984 A | 5/1995 | Marecot et al. | |
| 5,475,173 A | 12/1995 | Cheung et al. | |
| 5,488,024 A | 1/1996 | Cheung et al. | |
| 5,489,565 A | 2/1996 | Cheung et al. | |
| 5,510,550 A | 4/1996 | Cheung et al. | |
| 5,583,274 A | 12/1996 | Cheung et al. | |
| 5,585,318 A | 12/1996 | Johnson et al. | |
| 5,587,348 A | 12/1996 | Brown et al. | |
| 5,648,576 A | 7/1997 | Than et al. | |
| 5,698,752 A | 12/1997 | Brown et al. | |
| 5,866,735 A | 2/1999 | Cheung et al. | |
| 5,889,187 A | 3/1999 | Than et al. | |
| 6,040,489 A | 3/2000 | Imai | |
| 6,054,409 A | 4/2000 | Thanh et al. | |
| 6,084,140 A | 7/2000 | Kitamura et al. | |
| 6,096,933 A | 8/2000 | Cheung et al. | |
| 6,127,310 A * | 10/2000 | Brown et al. | 502/339 |
| 6,127,588 A | 10/2000 | Kimble et al. | |
| 6,130,260 A | 10/2000 | Hall et al. | |
| 6,323,247 B1 | 11/2001 | Hall et al. | |
| 6,350,717 B1 | 2/2002 | Frenzel et al. | |
| 6,383,966 B1 | 5/2002 | Han et al. | |
| 6,417,136 B2 | 7/2002 | Cheung et al. | |
| 6,433,235 B1 | 8/2002 | Cantrell | |
| 6,437,206 B1 * | 8/2002 | Meyer et al. | 585/260 |
| 6,602,920 B2 | 8/2003 | Hall et al. | |
| 6,635,600 B1 | 10/2003 | Kimble et al. | |
| 6,734,130 B2 | 5/2004 | Cheung et al. | |
| 7,045,670 B2 | 5/2006 | Johnson et al. | |
| 7,115,789 B2 | 10/2006 | Kuechler et al. | |
| 7,119,240 B2 | 10/2006 | Hall et al. | |
| 7,141,709 B2 | 11/2006 | Cheung et al. | |
| 7,183,451 B2 | 2/2007 | Gattis et al. | |
| 7,199,076 B2 * | 4/2007 | Bergmeister et al. | 502/224 |
| 7,208,647 B2 | 4/2007 | Peterson et al. | |
| 7,247,760 B2 | 7/2007 | Cheung et al. | |
| 7,417,007 B2 | 8/2008 | Cheung et al. | |
| 7,521,393 B2 * | 4/2009 | Blankenship et al. | 502/330 |
| 2001/0001805 A1 | 5/2001 | Brown et al. | |
| 2004/0192983 A1 | 9/2004 | Bergmeister et al. | |
| 2005/0048658 A1 | 3/2005 | Johnson et al. | |
| 2007/0149835 A1 | 6/2007 | Cheung et al. | |

FOREIGN PATENT DOCUMENTS

| | | | |
|---|---|---|---|
| DE | 3312953 A1 | 10/1983 | |
| DE | 3312252 A1 | 10/1984 | |
| EP | 0124744 A1 | 11/1984 | |
| EP | 0686615 A1 | 12/1995 | |
| EP | 0722776 A1 | 7/1996 | |
| EP | 0792685 A1 | 9/1997 | |
| EP | 0985447 A2 | 3/2000 | |
| EP | 0689872 B1 | 8/2001 | |
| FR | 2720956 A1 | 12/1995 | |
| GB | 832639 | 4/1960 | |
| GB | 1186869 A | 4/1970 | |
| GB | 1403556 | 8/1975 | |
| JP | 51143601 A | 12/1976 | |
| JP | 55-87727 * | 7/1980 | C07C 7/167 |
| JP | 55-87727 A * | 7/1980 | C07C 7/167 |
| JP | 63093352 A | 4/1988 | |
| JP | 2002186854 A | 7/2002 | |
| JP | 2004107814 A | 4/2004 | |
| WO | 9837966 A1 | 9/1998 | |
| WO | 9946041 A1 | 9/1999 | |
| WO | 0064846 A1 | 11/2000 | |
| WO | 03106020 A1 | 12/2003 | |
| WO | 2004074220 A1 | 9/2004 | |
| WO | 2005025746 A1 | 3/2005 | |
| WO | 2005026086 A1 | 3/2005 | |
| WO | 2005035689 A2 | 4/2005 | |
| WO | 2005035690 A2 | 4/2005 | |
| WO | 2005049533 A1 | 6/2005 | |
| WO | 2005066102 A1 | 7/2005 | |
| WO | 2006040159 A1 | 4/2006 | |
| WO | 2007015742 A2 | 2/2007 | |
| WO | 2007015742 A3 | 2/2007 | |

OTHER PUBLICATIONS

English Abstract of JP-55-87727 from Patent Abstracts of Japan, available on-line at www19.ipdl.inpitgo.jp—accessed May 28, 2013.*

English Abstract of JP-55-87727-A from Patent Abstracts of Japan, available on-line at wwwl 9.ipdl.inpitgo.jp—accessed May 28,2013.*

Foreign communication from a related counterpart application—Office Action, CN 200680032318.1, May 14, 2010, 6 pages.

Foreign communication from a related counterpart application—Office Action, CN 200680032318.1, Feb. 25, 2011, 5 pages.

Foreign communication from a related counterpart application—Exam Report, European Application No. 09180368.4, Nov. 17, 2010, 6 pages.

Foreign communication from a related counterpart application—European Search Report, European Application No. 09180368.4, Feb. 22, 2010, 7 pages.

Karhu, H., et al., "XPS analysis of chlorine residues in supported Pt and Pd catalysts with low metal loading," Applied Catalysis A: General, 2003, pp. 283-294, vol. 247, Elsevier Science B.V.

Botaiux, J.-P., "Newest hydrogenation catalysts," Mar. 1985, pp. 51-59, Hydrocarbon Processing.

Foreign communication from a related counterpart application—International Search Report, PCT/US/2004/041612, Apr. 5, 2005, 4 pages.

Foreign communication from a related counterpart application—International Search Report and Written Opinion, PCT/US2006/027298, Feb. 26, 2007, 16 pages.

Foreign communication from a related counterpart application—Invitation to Pay Additional Fees, PCT/US2006/027298, Dec. 11, 2006, 4 pages.

Park, Young H., "Potassium promoter for palladium on alumina selective hydrogenation catalysts," Chem. Commun., 1991, pp. 1188-1189, J. Chem. Soc.

Park, Young H., "Promotional effects of potassium on Pd/Al2O3 selective hydrogenation catalysts," Ind. Eng. Chem. Res., 1992, pp. 469-474, vol. 31, No. 2, American Chemical Society.

UOP Method 578-02, "Automated pore volume and pore size distribution of porous subtances by mercury porosimetry," 2002, pp. 1-14, ASTM Int'l, UOP LLC.

(56) References Cited

OTHER PUBLICATIONS

Office Action dated Mar. 9, 2009, (13 pages), U.S. Appl. No. 11/534,241, filed Sep. 22, 2006.
Foreign communication from a related counterpart application—International Preliminary Report on Patentability, PCT/US2004/038132, May 15, 2006, 6 pages.
Foreign communication from a related counterpart application—International Preliminary Examination Report, PCT/US2003/18284, Sep. 23, 2004, 6 pages.
Foreign communication from a related counterpart application—International Search Report and Written Opinion, PCT/US2004/038132, Apr. 5, 2005, 8 pages.
English machine translation of French patent 2,525,210 or DE 3312953 published Oct. 1983.
Foreign communication from a related counterpart application—EPO Exam Report, Sep. 29, 2008, Application No. 06787235.8, 2 pages.
Foreign communication dated Mar. 2, 2012 from a related counterpart application—Application No. JP 2008-523922, 7 pages.

* cited by examiner

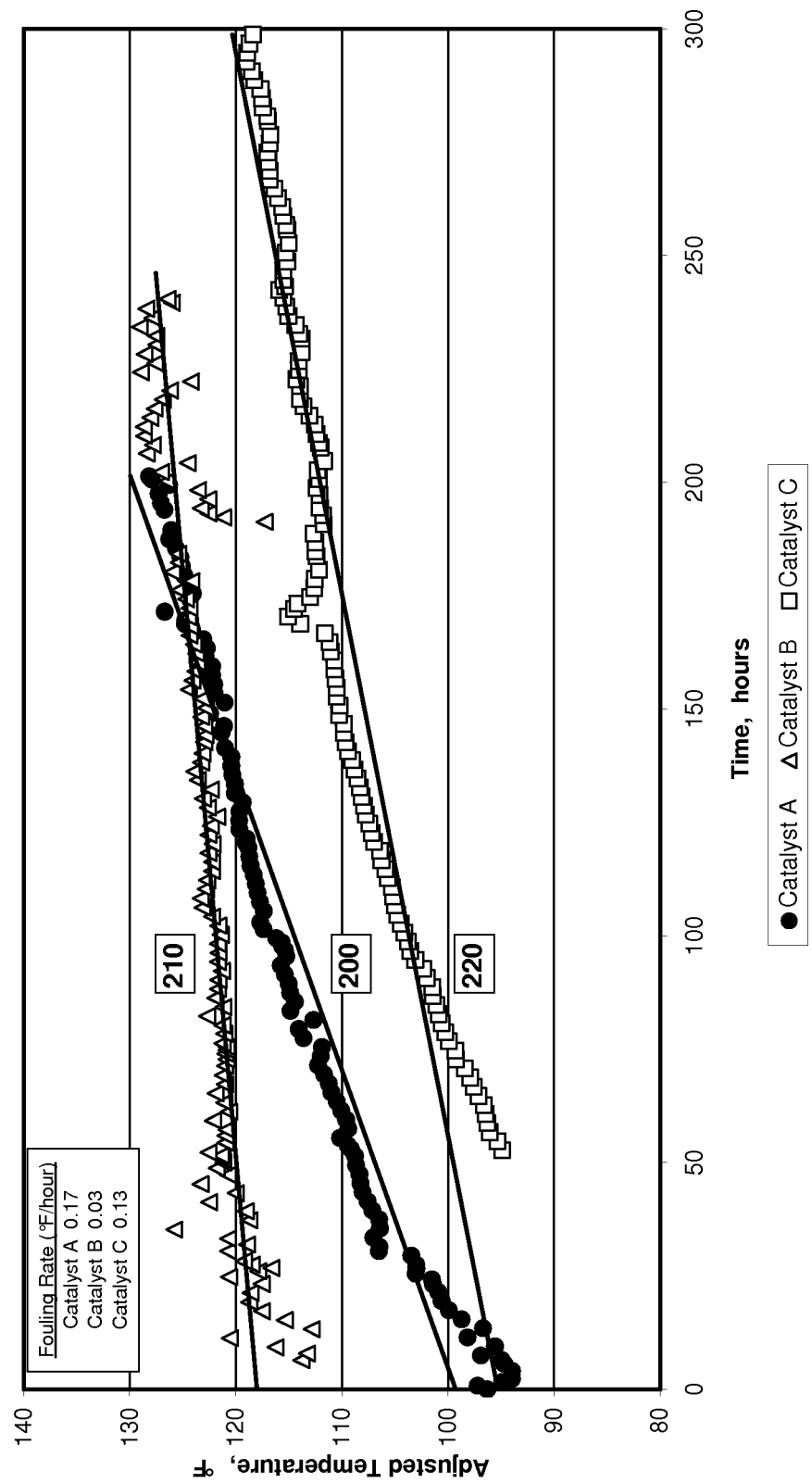

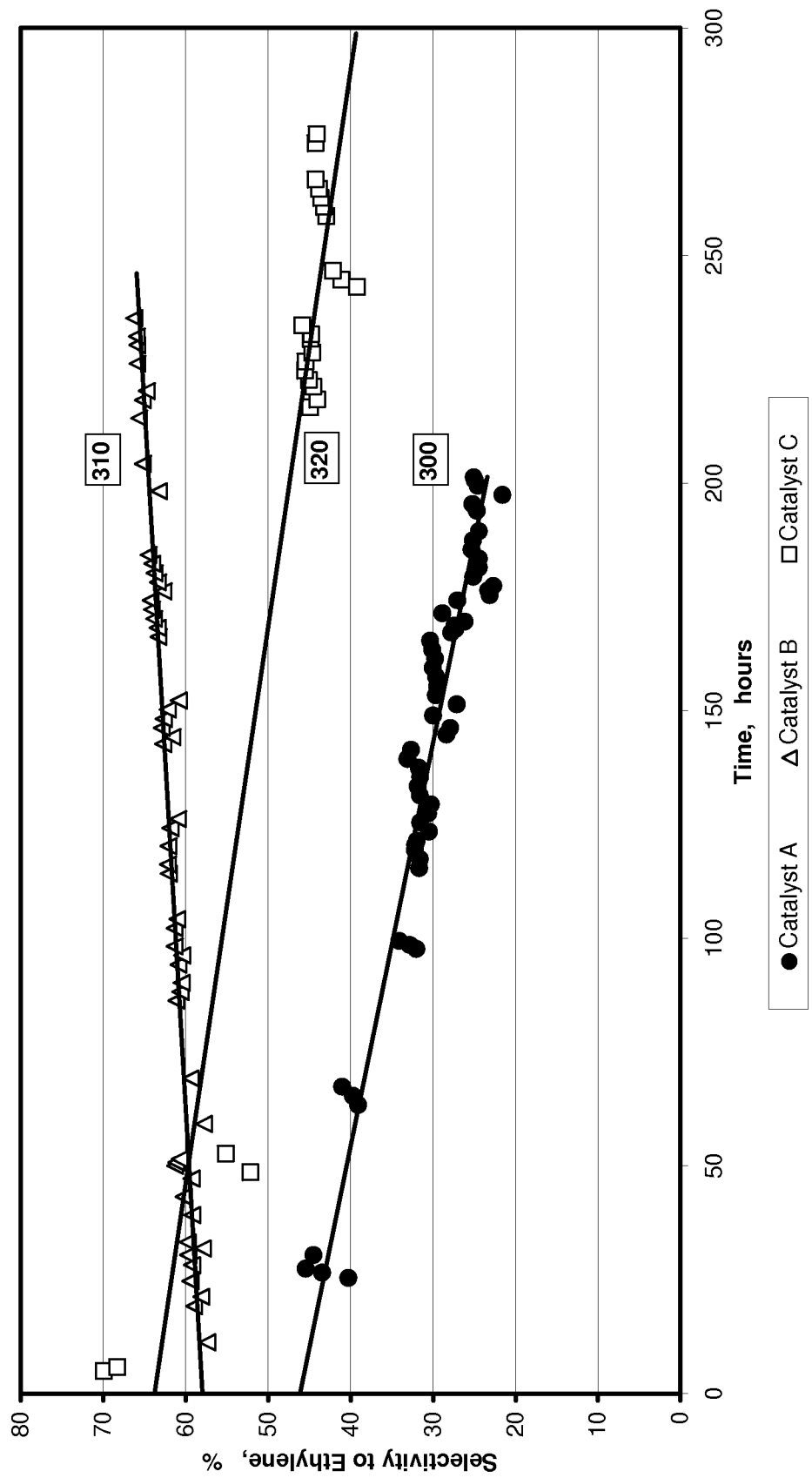

SELECTIVE HYDROGENATION CATALYST AND METHODS OF MAKING AND USING SAME

CROSS-REFERENCE TO RELATED APPLICATIONS

This is a Divisional Application of U.S. patent application Ser. No. 11/458,937, filed Jul. 20, 2006 and published as US 2007/0027030 A1, and entitled "A Selective Hydrogenation Catalyst and Methods of Making and Using Same," which claims priority under 35 U.S.C. §119(e) to U.S. Provisional Patent Application No. 60/702,745 entitled "A Selective Hydrogenation Catalyst and Methods of Making and Using Same" and filed on Jul. 27, 2005. Furthermore, the subject matter of this application is related to the subject matter of U.S. Provisional Patent Application No. 60/388,307 entitled "Hydrogenation Palladium-Silver Catalyst and Methods" and filed on Jun. 14, 2002, U.S. patent application Ser. No. 10/457,635 entitled "Hydrogenation Palladium-Silver Catalyst and Methods" and filed on Jun. 9, 2003, now U.S. Pat. No. 7,247,760 and U.S. patent application Ser. No. 10/741,800 entitled "Methods of Making and Using a Selective Hydrogenation Catalyst" and filed on Dec. 19, 2003, now U.S. Pat. No. 7,199,076. Each of the foregoing applications is hereby incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the production of unsaturated hydrocarbons, and more particularly to a selective hydrogenation catalyst and methods of making and using the same to selectively hydrogenate highly unsaturated hydrocarbons.

BACKGROUND OF THE INVENTION

Unsaturated hydrocarbons such as ethylene and propylene are often employed as feedstocks in preparing value added chemicals and polymers. Unsaturated hydrocarbons may be produced by pyrolysis or steam cracking of hydrocarbons including hydrocarbons derived from coal, hydrocarbons derived from synthetic crude, naphthas, refinery gases, ethane, propane, butane, and the like. Unsaturated hydrocarbons may also be produced by the conversion of alcohols. Unsaturated hydrocarbons produced in these manners usually contain small proportions of highly unsaturated hydrocarbons such as acetylenes and diolefins that adversely affect production of subsequent chemicals and polymers. Thus, to form an unsaturated hydrocarbon product such as a polymer grade monoolefin, the amount of acetylenes and diolefins in the monoolefin stream is typically reduced. For example, in polymer grade ethylene, acetylene content typically is less than about 2 ppm, alternatively, less than about 1 ppm.

One technique commonly used to reduce the amount of acetylenes and diolefins in an unsaturated hydrocarbon stream primarily comprising monoolefins involves selectively hydrogenating the acetylenes and diolefins to monoolefins. This process is selective in that hydrogenation of the monoolefin and the highly unsaturated hydrocarbons to saturated hydrocarbons is minimized. For example, the hydrogenation of ethylene or acetylene to ethane is minimized.

The selective hydrogenation may be performed using catalysts comprising palladium (Pd) on an inorganic support. However, in some circumstances, such selective hydrogenation catalysts can produce green oil by oligomerizing the acetylenes and diolefins. As used herein, green oil refers to molecules having more than four carbon atoms per molecule. Green oil is one of a number of contributors to the fouling of the selective hydrogenation catalysts and the resulting catalyst deactivation. The deactivation of the selective hydrogenation catalyst results in the catalyst having a lower activity and selectivity to unsaturated hydrocarbons. Green oil production is particularly apparent in backend hydrogenation reactors. A selective hydrogenation catalyst in such backend reactors requires regular regeneration, and with each regeneration cycle, the selectivity and the life of the catalyst decreases. Therefore, a need exists for a selective hydrogenation catalyst that undergoes less deactivation in between regeneration cycles during the hydrogenation of acetylenes and diolefins.

SUMMARY OF THE INVENTION

In an embodiment, disclosed is a method for producing a selective hydrogenation catalyst for hydrogenating a highly unsaturated hydrocarbon to an unsaturated hydrocarbon comprising contacting an inorganic catalyst support with a chlorine-containing compound to form a chlorided catalyst support (step (a)) and adding palladium to the chlorided catalyst support to form a supported-palladium composition which is a selective hydrogenation catalyst composition. The method may further comprise removing from the chlorided catalyst support an amount of chlorine-containing compound, decomposition products thereof or other unwanted elements after step (a) to produce a clean chlorided catalyst support having from about 10 to about 1200 ppm by weight chlorine.

The method may further comprise adding at least one selectivity enhancer to the supported-palladium composition to form an enhanced supported-palladium composition, wherein the selectivity enhancer comprises a compound selected from the group consisting of Group 1B metals, Group 1B metal compounds, phosphorus, sulfur, phosphorus compounds, sulfur compounds, alkaline metals, alkaline metal compounds, iodine, iodide compounds, and combinations thereof. The enhanced supported-palladium composition may comprise from about 0.001 to about 10 weight percent selectivity enhancer based on a total weight of the catalyst.

The chlorine-containing compound may comprise a compound selected from the group consisting of hydrochloric acid, an alkaline metal chloride, an alkaline earth chloride, and combinations thereof. Alternatively, the chlorine-containing compound may comprise a compound selected from the group consisting of potassium chloride, sodium chloride, lithium chloride, and combinations thereof. Alternatively, the chlorine-containing compound may comprise a compound selected from the group consisting of calcium chloride, barium chloride, and combinations thereof. Alternatively, the chlorine-containing compound may be described by the formula $N(H_vR_wR'_xR''_yR'''_z)Cl$; where R, R', R'', and R''' is methyl, ethyl, propyl, or butyl or any combination thereof; and v, w, x, y, z can be 0 to 4 provided $v+w+x+y+z=4$. Alternatively, the chlorine-containing compound may comprise a compound selected from the group consisting of ammonium chloride, methyl ammonium chloride, tetramethylammonium chloride, tetraethylammonium chloride, and combinations thereof. Alternatively, the chlorine-containing compound may comprise a compound described by the formula $CCl_xH_y$; wherein x+y=4. Alternatively, the chlorine-containing compound may comprise carbon tetrachloride. Alternatively, the chlorine-containing compound may comprise a compound described by the formula $C_2Cl_xH_y$; wherein x+y=6. Alternatively, the chlorine-containing compound may comprise trichloroethane. The selective hydrogenation catalyst may comprise from about 0.01 to about 1.0 weight percent palladium based on a total weight of the catalyst.

In an embodiment, disclosed is a selective hydrogenation catalyst for hydrogenating a highly unsaturated hydrocarbon to an unsaturated hydrocarbon formed by the method comprising contacting an inorganic catalyst support with a chlorine-containing compound to form a chlorided catalyst support and adding palladium to the chlorided catalyst support to form a supported-palladium composition which is a selective hydrogenation catalyst composition.

In an embodiment, disclosed is a method of selectively hydrogenating a highly unsaturated hydrocarbon to an unsaturated hydrocarbon comprising contacting the highly unsaturated hydrocarbon with a selective hydrogenation catalyst composition produced by contacting an inorganic catalyst support with a chlorine-containing compound to form a chlorided catalyst support and adding palladium to the chlorided catalyst support to form a supported-palladium composition. A fouling rate of the selective hydrogenation catalyst may be at least about 25 percent less than a fouling rate of the same catalyst when not supported on a chlorided catalyst support under hydrogenation conditions.

In an embodiment, disclosed is a catalyst for selectively hydrogenating a highly unsaturated hydrocarbon to an unsaturated hydrocarbon comprising a chlorided inorganic catalyst support, palladium, and silver. The catalyst may comprise from about 10 to about 1200, alternatively from about 20 to about 800 ppm by weight of chlorine; from about 0.01 to about 1.0, alternatively from about 0.01 to about 0.8 weight percent palladium based on a total weight of the catalyst; and (c) from about 0.01 to about 10, alternatively from about 0.01 to about 5 weight percent silver based on a total weight of the catalyst. The catalyst may further comprise one or more selectivity enhancers selected from the group consisting of iodine, iodide compounds, phosphorus, phosphorus compounds, sulfur, sulfur compounds, alkaline metals, alkaline metal compounds, and combinations thereof. The catalyst may comprise from about 0.001 to about 10 weight percent selectivity enhancer based on a total weight of the catalyst. The chlorided inorganic catalyst support may have a surface area of from about 2 to about 100 $m^2/g$.

DESCRIPTION OF THE DRAWINGS

The invention, together with further advantages thereof, may best be understood by reference to the following description taken in conjunction with the accompanying drawings in which:

FIG. 2 is a graph illustrating the relative fouling curves during the hydrogenation of acetylene for one control selective hydrogenation catalyst and two selective hydrogenation catalysts comprising palladium on an inorganic catalyst support modified by a chlorine-containing compound.

FIG. 3 is a graph illustrating the relative catalyst selectivity to ethylene during the hydrogenation of acetylene for one control selective hydrogenation catalyst and two selective hydrogenation catalysts comprising palladium on an inorganic catalyst support modified by a chlorine-containing compound.

DETAILED DESCRIPTION OF THE INVENTION

Figure 1:
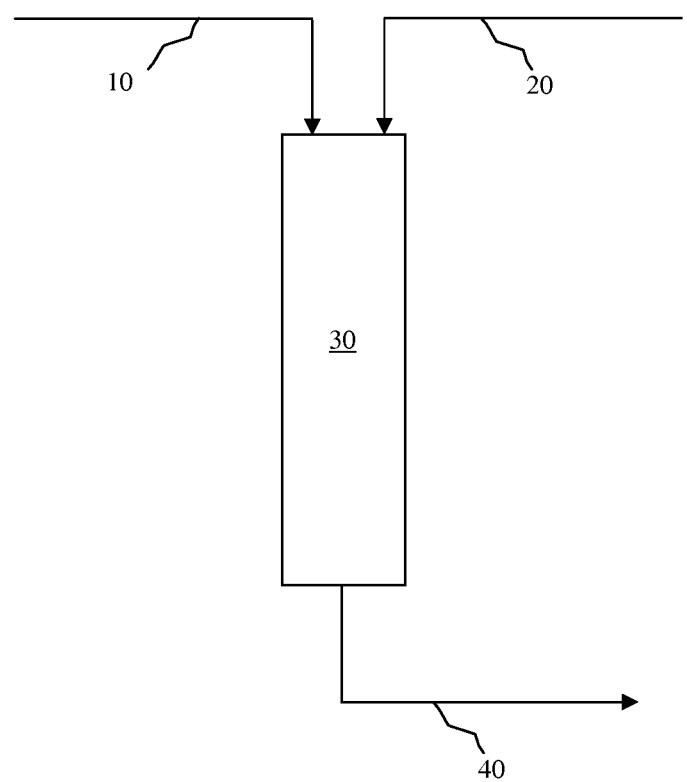
FIG. 1 depicts a process flow diagram of an embodiment in which an unsaturated hydrocarbon stream containing a highly unsaturated hydrocarbon is fed to a hydrogenation reactor for selective hydrogenation of the highly unsaturated hydrocarbon to a monoolefin.

In an embodiment, a method of making a catalyst for selectively hydrogenating highly unsaturated hydrocarbons to unsaturated hydrocarbons comprises contacting an inorganic catalyst support with a chlorine-containing compound to create a chlorided catalyst support. In an embodiment, the chlorine-containing compound is a gas, a liquid, or combinations thereof. Palladium is subsequently added to the chlorided catalyst support to create a supported-palladium composition useful as a selective hydrogenation catalyst. A suitable selectivity enhancer may be optionally added to the supported-palladium composition thereby creating an enhanced supported-palladium composition that is effective as a selective hydrogenation catalyst.

The details of such methods are provided below. As used herein, a highly unsaturated hydrocarbon is defined as a hydrocarbon containing at least one triple bond, conjugated carbon-carbon double bond, or cumulative carbon-carbon double bond. As used herein, an unsaturated hydrocarbon is defined as a hydrocarbon containing an isolated carbon-carbon double bond. Examples of highly unsaturated hydrocarbons include without limitation acetylene, methylacetylene and propadiene. Examples of unsaturated hydrocarbons include ethylene and propylene. It is also understood that the term "catalyst" refers to the support together with the materials impregnated in or on the support.

Unless specified to the contrary or apparent from the plain meaning of a phrase, the word "or" has the inclusive meaning.

In some embodiments, the catalyst support may comprise an inorganic support such as one or more aluminas, silicas, titanias, zirconias, aluminosilicates (such as clays and/or zeolites), spinels (such as zinc aluminate, zinc titanate, and/or magnesium aluminate), or combinations thereof. In some embodiments, a suitable catalyst support is an alpha (α)-alumina support.

A catalyst support having a surface area of from about 2 to about 100 square meters per gram ($m^2/g$) may be employed. Alternatively, the support may have a surface area of from about 2 to about 75 $m^2/g$, or from about 3 to about 50 $m^2/g$. The surface area of the support may be determined using any method known to one of ordinary skill in the art, alternatively using the well-known method of Brunauer, Emmett, and Teller ("BET") by measuring the quantity of nitrogen adsorbed on the catalyst. Alternatively, it can also be measured by mercury intrusion. A suitable mercury intrusion method is described in ASTM UOP 578-02, entitled "Automated Pore Volume and Pore Size Distribution of Porous Substances by MERCURY Porosimetry," which is incorporated herein by reference in its entirety.

Particles of the catalyst support generally have an average diameter of from about 1 to about 10 mm, alternatively from about 2 to about 6 mm, and can have any suitable shape. In an embodiment, the shape of the catalyst support may be cylindrical. In an alternative embodiment, the catalyst support may be spherical.

Initially, the inorganic catalyst support is contacted with a chlorine-containing compound to create a chlorided catalyst support. The chlorine-containing compound can be a gas, a liquid, or combinations thereof. An embodiment comprises contacting the inorganic catalyst support with a liquid chlorine-containing compound to create a chlorided catalyst support. Such a liquid may comprise at least one chlorine-containing compound. In some embodiments the liquid chlorine-containing compounds to which the inorganic catalyst support may be exposed to create the chlorided catalyst support include, but are not limited to, hydrochloric acid; alkaline metal chloride; alkaline earth chloride; chlorohydrocarbons; compounds described by the formula $N(H_vR_wR'_xR''_yR'''_z)Cl$, where R, R', R", and R''' is methyl, ethyl, propyl, butyl, or any combination thereof and v, w, x, y, z can be 0 to 4 provided v+w+x+y+z=4; or combinations thereof. In some embodiments, the alkaline metal chloride may comprise potassium chloride, sodium chloride, lithium chloride, or combinations thereof. In some embodiments, the alkaline earth chloride may comprise calcium chloride, barium chloride, or combinations thereof. In some embodiments, compounds described by the formula $N(H_vR_wR'_xR''_yR'''_z)Cl$ may comprise ammonium chloride, methyl ammonium chloride, tetramethylammonium chloride, tetraethylammonium chloride, or combinations thereof. Chloro-hydrocarbons as used herein may comprise compounds containing 1-10 carbons wherein there is at least one substitution of hydrogen for chlorine. In some embodiments chloro-hydrocarbons comprise compounds described by the formula $CCl_xH_y$ (where x+y=4); compounds described by the formula $C_2Cl_xH_y$ (where x+y=6); or combinations thereof. In some embodiments compounds described by the formula $CCl_xH_y$, comprise carbon tetrachloride, dichloromethane, or combinations thereof. In some embodiments, compounds described by the formula $C_2Cl_xH_y$, comprise trichloroethane. In an embodiment, the liquid chlorine-containing compound comprises potassium chloride in solution.

The inorganic catalyst support can be contacted with the liquid chlorine-containing compound in any suitable manner that will yield a selective hydrogenation catalyst meeting the parameters described herein. In an embodiment, the method used to contact an inorganic catalyst support with a liquid chlorine-containing compound may be incipient wetness impregnation, which is well known in the art. During incipient wetness impregnation, the pores of the support become substantially filled with the liquid chlorine-containing compound. Other contacting methods such as soaking may also be employed to contact the inorganic catalyst support with the liquid chlorine-containing compound to create a chlorided catalyst support.

An alternative embodiment comprises initially contacting the inorganic catalyst support with a gaseous chlorine-containing compound to create a chlorided catalyst support. In some embodiments, the chlorine-containing compounds that may be employed as gases include, but are not limited to, hydrogen chloride gas, chlorine gas, $CCl_xH_y$ (where x+y=4), $C_2Cl_xH_y$ (where x+y=6), or combinations thereof. In another embodiment, the gaseous chlorine-containing compounds are obtained by heating a volatile chloro-hydrocarbon or mixture thereof.

A method used to contact an inorganic catalyst support with a gaseous chlorine-containing compound may be accomplished by heating the inorganic catalyst support in the presence of a gaseous chlorine-containing compound and optionally in the presence of oxygen, water, nitrogen, hydrogen or mixtures thereof to create a chlorided catalyst support. In an embodiment, the inorganic catalyst support may be contacted with a gaseous chlorine-containing compound at temperatures of from about 300° C. to about 850° C. for from about 0.2 to about 20 hours.

The amount of chlorine-containing compound deposited on the inorganic support is controlled independently of the contact method, whether by liquid contacting, gas phase contacting, or combination thereof. The contacting method may deposit an amount of chlorine-containing compound such that the chlorided catalyst support, i.e., the catalyst support after exposure to a chlorine-containing compound, comprises from about 20 to about 0.001 weight percent chlorine based on a total weight of the chlorided catalyst support, alternatively from about 10 to about 0.001 weight percent chlorine, alternatively from about 2 to about 0.001 weight percent chlorine.

After the inorganic catalyst support has been contacted with the chlorine-containing compound to create the chlorided catalyst support, the chlorided catalyst support may be removed from contact with the chlorine-containing compound and processed to remove from the chlorided catalyst support unwanted elements such as an amount of chlorine-containing compound, decomposition products thereof, or other unwanted elements to create a clean chlorided catalyst support and otherwise prepare the chlorided catalyst support for exposure to palladium. Removing an amount of chlorine-containing compound and/or any other unwanted elements may occur via a wash, via vaporization, or combinations thereof, depending, for example, on the type of chlorine-containing compound involved. The vaporization may be accomplished at a temperature of from about 300° C. to about 850° C. for from about 0.2 to about 20 hours. After processing, the clean chlorided catalyst support may comprise from about 5 to about 2000 ppm by weight of chlorine; alternatively, may comprise from about 10 to about 1200 ppm by weight of chlorine; alternatively, from about 20 to about 800 ppm by weight of chlorine; alternatively, from about 30 to about 400 ppm by weight of chlorine with respect to the support.

In an embodiment, a chlorided catalyst support produced by contact with a liquid chlorine-containing compound may be exposed to an elevated temperature of from about 50° C. to about 850° C. for from about 0.5 to about 20 hours to dry and/or calcine the chlorided catalyst support, thereby producing a cleaned chlorided catalyst support. In some embodiments, an optional washing step may follow the exposure to an elevated temperature. For example, the support may be washed with water at temperatures of from about 20° C. to about 100° C. for from about 1 minute to about 2 hours. In an embodiment, the washing utilizes boiling distilled or deionized water and occurs after drying and/or calcining. Following the washing step, the chlorided catalyst support may optionally undergo another exposure to an elevated temperature of from about 50° C. to about 900° C. for from about 0.5 to about 20 hours to remove any unwanted moisture.

In another embodiment, a chlorided catalyst support produced by contact with a gaseous chlorine-containing compound may be cleaned via vaporization or washing or a combination thereof to remove an amount of chlorine containing compound, decomposition products thereof, or other unwanted elements. In an embodiment, after contacting the inorganic catalyst support with the gaseous chlorine-containing compound, flow of the gaseous chlorine containing compound is stopped, and the gaseous treated chlorided catalyst support may be continued to be heated and/or calcined by exposure to an elevated temperature in the absence of the gaseous chlorine containing compound to produce a cleaned chlorided catalyst support. Exposure to an elevated temperature may occur in the presence of oxygen, water, nitrogen and mixtures thereof for less than or equal to about 18 hours. This vaporization removal step may be optionally followed by exposing the chlorided catalyst support with a heated stream of gas free of the chlorine containing compound to further remove any unwanted elements. After processing, the cleaned chlorided catalyst support may comprise from about 5 to about 2000 ppm by weight of chlorine; alternatively, may comprise from about 10 to about 1200 ppm by weight of chlorine; alternatively, from about 15 to about 800 ppm by weight of chlorine; alternatively, from about 15 to about 400 ppm by weight of chlorine with respect to the support.

Next, palladium may be added to the clean chlorided catalyst support to create a supported-palladium composition. Addition of the palladium may be accomplished by contacting the support with a palladium-containing solution comprising palladium metal or a palladium-containing compound such as palladium chloride or palladium nitrate using any suitable manner that will yield a selective hydrogenation catalyst meeting the parameters described herein. In an embodiment, the palladium-containing solution is an aqueous solution. In an embodiment, the method used to contact a clean chlorided catalyst support with a palladium-containing solution may be incipient wetness impregnation, which is well known in the art. The palladium-containing solution may contain a sufficient amount of palladium to form a supported-palladium composition having from about 0.01 to about 1.0 weight percent palladium, alternatively from about 0.01 to about 0.8 weight percent palladium, alternatively from about 0.01 to about 0.5 weight percent palladium, all weight percentages being by weight of the supported-palladium composition. In an embodiment, the palladium-containing solution is added to the clean chlorided catalyst support in a manner to cause at least about 95 weight percent of the supported-palladium composition particles to have the palladium concentrated near the periphery of the supported-palladium composition particles such that those particles have a so-called palladium skin.

As used herein, the term "palladium skin" refers to a peripheral layer of the supported-palladium composition that contains at least about 95 weight percent of the palladium incorporated in the support. The palladium skin can be any thickness as long as such thickness can promote the hydrogenation process disclosed herein. Generally, the thickness of the palladium skin can be in the range of from about 1 micron to about 3000 microns, alternatively from about 5 microns to about 2500 microns, alternatively from about 5 microns to about 2000 microns. For further reference, the teachings of U.S. Pat. Nos. 4,404,124 and 4,484,015 are instructive and are incorporated by reference herein.

Suitable methods for determining the concentration of the palladium in the skin of the supported-palladium composition are known in the art. Determining the concentration of the palladium in the skin of the supported-palladium composition helps in determining the thickness of the skin. One technique that may be employed to determine the palladium skin thickness is the electron microprobe method. Another technique involves breaking open a representative sample of the supported-palladium composition particles and treating the supported-palladium composition particles with a dilute alcoholic solution of N,N-dimethyl-para-nitrosoaniline. The treating solution reacts with the palladium to give a red color that can be used to evaluate the distribution of the palladium. Yet another technique for measuring the concentration of the palladium in the skin of the supported-palladium composition involves breaking open a representative sample of catalyst particles, followed by treating the particles with a reducing agent such as hydrogen to change the color of the skin and thereby evaluate the distribution of the palladium.

The supported-palladium composition formed by contacting the clean chlorided catalyst support with the palladium-containing solution optionally may be dried at a temperature of from about 25° C. to about 150° C. for a period of from about 0.5 hour to about 20 hours to produce a selective hydrogenation catalyst. The supported-palladium composition described above may optionally be further calcined at a temperature of from about 200° C. to about 850° C. for a period of from about 0.2 to about 20 hours.

In an alternate embodiment, one or more selectivity enhancers may be added to the supported-palladium composition to produce an enhanced supported-palladium composition useful as a selective hydrogenation catalyst. In one embodiment, this addition can occur by soaking the supported-palladium composition in a liquid comprising one or more suitable selectivity enhancers. In another embodiment, this addition can occur by incipient wetness impregnation of the supported-palladium composition with liquid comprising one or more suitable selectivity enhancers. This additional step may be optionally followed by again drying and/or calcining the enhanced supported-palladium composition as described above to produce an enhanced supported-palladium composition useful as a selective hydrogenation catalyst.

In an embodiment, suitable selectivity enhancers include, but are not limited to, Group 1B metals, Group 1B metal compounds, phosphorus, sulfur, phosphorus compounds, sulfur compounds, alkaline metals, alkaline metal compounds, iodine, iodide compounds, or combinations thereof. In an embodiment, the selectivity enhancer comprises silver (Ag), silver compounds, iodine, iodine compounds, or combinations thereof. For example, silver in the form of a silver compound such as silver nitrate may be added to the supported-palladium composition.

In an embodiment the resulting enhanced supported-palladium composition may comprise from about 0.001 weight percent to about 10 weight percent of the selectivity enhancer, alternatively from about 0.01 weight percent to about 5 weight percent selectivity enhancer, alternatively from about 0.01 weight percent to about 2 weight percent selectivity enhancer, all weight percentages being based on a total weight of the enhanced supported palladium composition.

In an alternative embodiment the resulting enhanced supported-palladium composition may comprise from about 0.01 weight percent to about 10 weight percent silver, alternatively from about 0.01 weight percent to about 5 weight percent silver, alternatively from about 0.01 weight percent to about 2 weight percent silver. In a further embodiment, the resulting enhanced supported-palladium composition may comprise from about 0.001 weight percent to about 10 weight percent iodine, alternatively from about 0.01 weight percent to about 5 weight percent iodine, alternatively from about 0.01 weight percent to about 2 weight percent iodine.

In an embodiment, iodine may optionally be added to the enhanced supported-palladium composition in addition to silver using a number of techniques, e.g., incipient wetness impregnation or soaking, and the support may again be dried and/or calcined to produce an enhanced supported-palladium composition useful as a selective hydrogenation catalyst. Iodine may be added simultaneously with the silver, or sequentially before or after the silver. The concentration of iodine in the resulting selective hydrogenation catalyst may range from about 1 ppm to about 1,000 ppm by weight, alternatively from about 1 ppm to about 800 ppm by weight, alternatively from about 1 ppm to about 500 ppm by weight all ppm by weight being based on a total weight of the enhanced supported palladium composition. In some embodiments, the suitable iodine-containing materials include, but are not limited to, elemental iodine, ammonium iodide, potassium iodide, tetraalkylammonium iodide (e.g., tetramethylammonium iodide and tetraethylammonium iodide), potassium iodate, ammonium iodate, or combinations thereof. The resulting selective hydrogenation catalyst can be dried and/or calcined prior to using the selective hydrogenation catalyst in the hydrogenation process. In some embodiments, this drying step can be carried out at a temperature in the range of from about 25° C. to about 150° C. for a period of from about 0.5 hour to about 20 hours. In some embodiments, this calcining step can be carried out at temperatures up to about 850° C., e.g., in the range of from about 150° C. to about 700° C., for a period of from about 0.2 to about 20 hours.

In some embodiments, the one or more selectivity enhancers can be distributed throughout the enhanced supported-palladium composition using methods known to those skilled in the art. In an embodiment, the supported-palladium composition particles can be placed in an aqueous silver nitrate solution of a quantity greater than that necessary to fill the pore volume of the particles. The resulting enhanced supported-palladium composition may be dried and/or calcined to decompose the silver-containing compounds before using the enhanced supported-palladium composition as a catalyst in the selective hydrogenation process. In some embodiments, this drying may be performed at a temperature in the range of from about 25° C. to about 150° C. for a period of from about 0.5 to about 20 hours. In some embodiments, this calcining step may be performed at temperatures up to about 850° C., e.g., in the range of from about 150° C. to about 750° C., for a period of from about 0.2 to about 20 hours.

Optionally, the drying or calcining may be followed by a reduction step to reduce the metals (e.g., catalytic metals) in the enhanced supported-palladium composition. This reduction step may be accomplished in a variety of ways, all well known in the art. One embodiment comprises reducing the enhanced supported-palladium composition using hydrogen gas or a hydrogen gas containing feed, e.g., the feed stream of the selective hydrogenation process, to reduce the catalytic metals, thereby providing for optimum operation of the selective hydrogenation process. Such a gaseous hydrogen reduction may be carried out at a temperature in the range of from, for example, about 25° C. to about 450° C.

In an embodiment, a selective hydrogenation catalyst composition formed in accordance with the method described above comprises an α-alumina support treated with a chlorine-containing compound, palladium, and optionally at least one selectivity enhancer, e.g., silver and/or iodine. Further, such a selective hydrogenation catalyst may comprise a support having a surface area of from about 2 to about 100 square meters per gram ($m^2/g$); alternatively from about 2 to about 75 $m^2/g$, or from about 3 to about 50 $m^2/g$.

In some embodiments, methods of using the previously described selective hydrogenation catalysts, for example in a selective hydrogenation process, comprises contacting an unsaturated hydrocarbon stream primarily containing an unsaturated hydrocarbon, e.g., ethylene, but also containing a highly unsaturated hydrocarbon, e.g., acetylene, with such catalyst compositions. The contacting may be executed in the presence of hydrogen at conditions effective to selectively hydrogenate the highly unsaturated hydrocarbon to an unsaturated hydrocarbon. In an embodiment, the selective hydrogenation catalysts of this disclosure are used in the hydrogenation of highly unsaturated hydrocarbons such as for example and without limitation acetylene, methylacetylene, propadiene or combinations thereof.

FIG. 1 illustrates an embodiment of a hydrogenation process that utilizes a selective hydrogenation catalyst made in the manner described above. The hydrogenation process includes feeding an unsaturated hydrocarbon stream 10 and a hydrogen ($H_2$) stream 20 to a hydrogenation reactor 30 within which the selective hydrogenation catalyst is disposed. The unsaturated hydrocarbon stream 10 primarily comprises one or more unsaturated hydrocarbons, but it also contains one or more highly unsaturated hydrocarbons such as for example and without limitation acetylene, methylacetylene and propadiene. Alternatively, unsaturated hydrocarbon stream 10 and hydrogen stream 20 may be combined in a single stream (not shown) that is fed to hydrogenation reactor 30. Accordingly, unsaturated hydrocarbon stream 10 may comprise hydrocarbons, including one or more unsaturated hydrocarbons such as ethylene and one or more highly unsaturated hydrocarbons such as acetylene, methylacetylene and propadiene.

In an embodiment, reactor 30 is a selective hydrogenation reactor that may belong to an acetylene removal unit of an unsaturated hydrocarbon production plant in a backend configuration. As used herein, "backend" refers to the location of the acetylene removal unit in an unsaturated hydrocarbon production unit that receives the lower boiling fraction from a deethanizer fractionation tower that receives the higher boiling fraction from a demethanizer fractionation tower that receives a feed from an unsaturated hydrocarbon production process.

In an embodiment, reactor 30 is a selective hydrogenation reactor that may belong to an acetylene removal unit of an unsaturated hydrocarbon production plant in a frontend deethanizer configuration. As used herein, "frontend deethanizer" refers to the location of the acetylene removal unit in an unsaturated hydrocarbon production unit that receives the lower boiling fraction from a deethanizer fractionation tower that receives a feed from an unsaturated hydrocarbon production process.

In an embodiment, reactor 30 is a selective hydrogenation reactor that may belong to an acetylene removal unit of an unsaturated hydrocarbon production plant in a frontend depropanizer configuration. As used herein, "frontend depropanizer" refers to the location of the acetylene removal unit in an unsaturated hydrocarbon production unit that receives the lower boiling fraction from a depropanizer fractionation tower that receives a feed from an unsaturated hydrocarbon production process.

In an embodiment, reactor 30 is a selective hydrogenation reactor that may belong to an acetylene removal unit of an unsaturated hydrocarbon production plant in a raw gas configuration. As used herein, "raw gas" refers to the location of the acetylene removal unit in an unsaturated hydrocarbon production unit that receives a feed from an unsaturated hydrocarbon production process without any intervening hydrocarbon fractionation.

It is understood that hydrogenation reactor 30, and likewise the selective hydrogenation catalysts disclosed herein, is not limited to use in backend acetylene removal units, frontend deethanizer units, frontend depropanizer, or raw gas units and may be used in any process wherein a highly unsaturated hydrocarbons contained within an unsaturated hydrocarbon stream is selectively hydrogenated to a unsaturated hydrocarbon.

In those embodiments wherein the acetylene removal unit is in a backend configuration, the highly unsaturated hydrocarbon being fed to the hydrogenation reactor 30 comprises acetylene. The mole ratio of the hydrogen to the acetylene being fed to hydrogenation reactor 30 may be in the range of from about 0.1 to about 10, alternatively from about 0.2 to about 5, alternatively from about 0.5 to about 3.

In those embodiments wherein the acetylene removal unit is in a front end deethanizer, front-end depropanizer or raw gas configuration, the highly unsaturated hydrocarbon being fed to the hydrogenation reactor 30 comprises acetylene. In such an embodiment, the mole ratio of the hydrogen to the acetylene being fed to the hydrogenation reactor 30 may be in the range of from about 10 to about 3000, alternatively from about 10 to about 2000, alternatively from about 10 to about 1500.

In those embodiments wherein the acetylene removal unit is in a front-end depropanizer or raw gas configuration, the highly unsaturated hydrocarbon being fed to the hydrogenation reactor 30 comprises methylacetylene. In such an embodiment, the mole ratio of the hydrogen to the methylacetylene being fed to the hydrogenation reactor 30 may be in the range of from about 3 to about 3000, alternatively from about 5 to about 2000, alternatively from about 10 to about 1500.

In those embodiments wherein the acetylene removal unit is in a front-end depropanizer or raw gas configuration, the highly unsaturated hydrocarbon being fed to the hydrogenation reactor 30 comprises propadiene. In such an embodiment, the mole ratio of the hydrogen to the propadiene being fed to the hydrogenation reactor 30 may be in the range of from about 3 to about 3000, alternatively from about 5 to about 2000, alternatively from about 10 to about 1500.

In another embodiment, reactor 30 may represent a plurality of reactors. The plurality of reactors may optionally be separated by a means to remove heat produced by the reaction. The plurality of reactors may optionally be separated by a means to control inlet and effluent flows from reactors or heat removal means allowing for individual or alternatively groups of reactors within the plurality of reactors to be regenerated. The selective hydrogenation catalyst may be arranged in any suitable configuration within hydrogenation reactor 30, such as a fixed catalyst bed.

Carbon monoxide may also be fed to reactor 30 via a separate stream (not shown), or it may be combined with hydrogen stream 20. In an embodiment, the amount of carbon monoxide being fed to reactor 30 during the hydrogenation process is less than about 0.15 mol % based on the total moles of fluid being fed to reactor 30.

Hydrogenation reactor 30 may be operated at conditions effective to selectively hydrogenate highly unsaturated hydrocarbons to one or more unsaturated hydrocarbons upon contacting the selective hydrogenation catalyst in the presence of the hydrogen. The conditions are desirably effective to maximize hydrogenation of highly unsaturated hydrocarbons to unsaturated hydrocarbons and to minimize hydrogenation of highly unsaturated hydrocarbons to saturated hydrocarbons. In some embodiments, acetylene may be selectively hydrogenated to ethylene. Alternatively methylacetylene may be selectively hydrogenated to ethylene; alternatively propadiene may be selectively hydrogenated to propylene. In some embodiments, the temperature within the hydrogenation zone may be in the range of from about 5° C. to about 300° C., alternatively from about 10° C. to about 250° C., or from about 15° C. to about 200° C. In some embodiments, the pressure within the hydrogenation zone may be in the range of from about 15 (204 kPa) to about 2,000 (13,890 kPa) pounds per square inch gauge (psig), alternatively from about 50 psig (446 kPa) to about 1,500 psig (10,443 kPa), or from about 100 psig (790 kPa) to about 1,000 psig (6,996 kPa).

Referring back to FIG. 1, an effluent stream 40 comprising unsaturated hydrocarbons, including the one or more monoolefins produced in hydrogenation reactor 30, and any unconverted reactants exit hydrogenation reactor 30. In an embodiment, effluent stream 40 primarily comprises ethylene and contains less than about 5 ppm, desirably less than about 1 ppm of highly unsaturated hydrocarbons.

The selective hydrogenation catalyst contained in hydrogenation reactor 30 may be regenerated as needed. In some embodiments, regeneration of the selective hydrogenation catalyst may be accomplished by optionally stream stripping the selective hydrogenation catalyst then calcining the catalyst in the presence of a gas comprising oxygen at a temperature not in excess of about 500° C. to burn off any organic matter, polymer, or char.

EXAMPLES

The invention having been generally described, the following example exemplifies embodiments of the invention and demonstrates the practice and advantages thereof. It is understood that these examples are given by way of illustration and are not intended to limit the specification or the following claims in any manner. All numerical values are approximate. When numerical ranges are given, it should be understood that embodiments outside the stated ranges may still fall within the scope of the invention. Specific details described in each example should not be construed as necessary features of the invention.

In the following examples, the amount of green oil produced by each selective hydrogenation catalyst sample was calculated as follows:

$$\text{weight \% green oil} = (((\text{final catalyst weight} - \text{initial catalyst weight})/\text{initial catalyst weight})/\text{days on stream}) \times 100$$

Further, the selectivity (sel.) to ethylene was also calculated using the following set of equations, where "$C_4$" represents butane, butenes and butadiene and where "heavies" refer to hydrocarbons having more carbon atoms than $C_4$:

$$\text{selectivity to ethane} = (\text{weight of ethane made}/\text{weight of acetylene consumed}) \times 100$$

$$\text{selectivity to } C_4\text{'s} = (\text{weight of } C_4\text{'s made}/\text{weight of acetylene consumed}) \times 100$$

$$\text{selectivity to heavies} = (\text{weight of heavies made}/\text{weight of acetylene consumed}) \times 100$$

$$\text{selectivity to ethylene} = 100 - \text{sel. to ethane} - \text{sel. to } C_4\text{'s} - \text{sel. to heavies}$$

The fouling rate was determined by plotting reaction temperature, while maintaining the acetylene conversion at 90%, as a function of time for each sample and then taking the slope of that line. A selectivity comparison was also made by plotting the selectivity to ethylene at 90% acetylene conversion as a function of time for each sample and then integrating the curve from 0 to 200 hours. Table 1, below, shows these fouling rate and selectivity area values after 200 hours on stream. The area values represent the results of integrating the selectivity curves from 0 to 200 hours.

In the following examples, the amount of chlorine on the chlorinated inorganic support, the selective hydrogenation catalyst or any intermediate product was determined by x-ray spectroscopic methods. In this method samples were pulverized in a ball mill and pressed into a 31 mm disk. X-Ray Florescence data (XRF) was collected. The concentration of chlorine was determined using a standardless analysis software package. All concentrations are semiquantitative.

Example 1

The following example illustrates the preparation of various palladium-containing selective hydrogenation catalyst samples, and the use of the samples in a selective hydrogenation process.

Catalyst A (control) was prepared on $\alpha\text{-}Al_2O_3$ pellets supplied by Süd Chemie of Louisville, Ky., USA in the form of 4 mm×4 mm tablets as described in U.S. Pat. No. 4,484,015. The $\alpha\text{-}Al_2O_3$ pellets had a surface area of about 5 to about 7 $m^2/g$ (determined by the BET method employing $N_2$). Catalyst A contained 0.02 weight percent palladium and 0.12 weight percent silver and 99 weight percent $Al_2O_3$.

Catalyst B was prepared as follows: an aqueous solution of about 1.13 g $NH_4Cl$ in about 16 g distilled water was added to about 50 g of $\alpha\text{-}Al_2O_3$ pellets (4 mm×4 mm, surface area of about 5 to about 7 $m^2/g$, provided by Süd Chemie of Louisville, Ky., USA) followed by drying at about 125° C. for about 1 hour. The support was then calcined at about 538° C. for about three hours in air. Next about 0.02 weight percent palladium and about 0.12 weight percent silver were added as described in U.S. Pat. No. 4,484,015.

Catalyst C was prepared as follows: an aqueous solution of about 7.49 g KCl in about 92 g distilled water was added to about 325 g of $\alpha\text{-}Al_2O_3$ pellets (4 mm×4 mm, surface area of about 5 to about 7 $m^2/g$, provided by Süd Chemie of Louisville, Ky., USA) followed by drying at about 125° C. for about 1 hour. The support was then calcined at about 850° C. for about 2 hours in air. The support was then washed repeatedly with boiling distilled water until the wash solution gave a negative chlorine test with an about 1 M $AgNO_3$ solution. The subsequent support was dried at about 125° C. for about 1 hour and calcined at about 538° C. for about 3 hours. Next about 0.02 weight percent palladium (Pd) and about 0.12 weight percent silver (Ag) were added as described in U.S. Pat. No. 4,484,015.

Reactor runs with each of the above catalysts, A through C, were made under laboratory test conditions. Laboratory test conditions are performed in the following manner: about 20 mL of catalyst was mixed with about 40 mL of 14 grit alundum and placed in a stainless steel jacketed reactor tube having an inner diameter of about 0.62 inch (15.7 mm) and a length of about 18 inches (457 mm). The reactor had a 3/16" thermowell running the length of the catalyst bed in the center of the reactor. The catalyst bed resided in the middle of the reactor and both ends of the reactor were packed with about 40 mL of alundum. The reaction temperature was controlled by circulating ethylene glycol through the jacket of the reactor tube. The catalyst was then activated with hydrogen at a flow rate of about 200 mL/min at atmospheric pressure at 170° F. (77° C.) for two hours.

Next, the catalyst was contacted with a feed gas comprising approximately 13 weight percent methane, 85.8 weight percent ethylene, 1.2 weight percent acetylene, at a flow rate of about 913 mL/min at about 200 psig (1480 kPa). Hydrogen was added to give an about 1.3 molar ratio of hydrogen to acetylene. The reaction temperature was adjusted to yield an acetylene conversion of about 90%. Conversion is referred to as the disappearance of acetylene. Gas analyses were performed by gas chromatography using an $Al_2O_3$ plot column. Selectivities were calculated on a weight basis.

Table I, below, contains pertinent data regarding the performance of the catalysts, A through C, described above.

TABLE 1

| Invention or control | Catalyst | Composition wt % | Cl source | Foul rate ° F./h | Selectivity to ethylene @ 200 h | Selectivity Area @ 200 h | wt % green oil g/g/day |
|---|---|---|---|---|---|---|---|
| Control | A | 0.02 Pd, 0.12 Ag | none | 0.17 | 25 | 6970 | 0.65 |
| Invention | B | 0.02 Pd, 0.12 Ag | $NH_4Cl$ | 0.07 | 66 | 12,230 | 0.28 |
| Invention | C | 0.02 Pd, 0.12 Ag | KCl | 0.14 | 46 | 10,880 | 0.40 |

As indicated by the data in Table 1, contacting an inorganic catalyst support with a chlorine-containing compound increases the selectivity to ethylene among selective hydrogenation catalysts comprising palladium. Catalysts B and C, each modified by contacting with either $NH_4Cl$ or KCl, both demonstrate significantly higher selectivities to ethylene compared to control catalyst A. In addition, the foul rate for catalysts B and C is lower than that of the control catalyst. In addition, green oil production is reduced.

Example 2

FIG. 2 illustrates relative foul curves in degrees Fahrenheit per hour (° F./hour) for one control selective hydrogenation catalyst A, and two catalysts prepared in accordance with the methods described herein for use in an otherwise typical hydrogenation process (selective hydrogenation catalysts B and C). Line 200 tracks reactor temperature over time for a reactor run made with the control Catalyst A. Catalyst A is a selective hydrogenation catalyst comprising palladium/silver supported on an $Al_2O_3$ support. Line 210 tracks reactor temperature over time for a reactor run made using Catalyst B, which is a selective hydrogenation catalyst comprising palladium/silver supported on a chlorided catalyst support produced using ammonium chloride as the chlorine-containing compound. Line 220 tracks reactor temperature over time for a reactor run made using Catalyst C, which is a selective hydrogenation catalyst comprising palladium/silver supported on a chlorided catalyst support produced using potassium chloride as the chlorine-containing compound. The fouling rate related to line 200 is about 0.17 degrees Fahrenheit per hour. The fouling rate indicated by line 210 is about 0.07 degrees Fahrenheit per hour, and the fouling rate indicated by line 220 is about 0.14 degrees Fahrenheit per hour. Thus, the fouling rate demonstrated by the selective hydrogenation catalysts comprising inorganic catalyst supports modified by chlorine-containing compounds (line 210 and 220) are reduced relative to the control catalyst. The lower fouling rates related by line 210 and 220 are also associated with a reduction in green oil generation when compared to the control catalyst (200). The fouling rate for a selective hydrogenation catalyst as described herein may be, for example, at least about 25 percent less, at least about 50 percent less, or at least about 80 percent less than a fouling rate of the same catalyst when not contacted with a chlorine-containing compound and run under control conditions.

Example 3

For the selective hydrogenation catalysts and reactor runs described in Example 2, FIG. 3 illustrates relative data for selectivity to ethylene. Line 300 tracks selectivity to ethylene over time of the control catalyst A. Lines 310 and 320 track the selectivity to ethylene over time of the catalysts comprising palladium and a support modified by a chlorine-containing compound (Catalysts B and C). The selectivity for ethylene indicated by line 310 and 320 are greater relative to the selectivity indicated by the control catalyst (line 300). Furthermore, the selectivity represented by line 310 and 320 is more stable over time than line 300. The percent selectivity improvement may be based on the integrated area under the selectivity versus time curve in FIG. 3 as shown in Table 1.

As a result of improvements in fouling rate, green oil production, and selectivity to unsaturated hydrocarbons, the life of the selective hydrogenation catalyst is extended such that the catalyst requires regeneration less often, resulting in lower operating costs of the hydrogenation process.

Example 4

The following example illustrates the application of the catalyst in a front-end depropanizer reactor process. Hydrogenation runs were made with 20 cc of the previously described catalysts. The catalysts were placed in a stainless steel reactor tube having a 0.62 inch inner diameter and a length of about 18 inches. The catalyst resided in the middle of the reactor, and both ends of the reactor were packed with 10 mL of alundum. The catalyst was reduced at about 100° F. for about 1 hour under hydrogen gas flowing at 200 mL/min and at 200 pounds per square inch gauge (psig). A feed stream typical of a feed from the top of a de-propanizer fractionation tower in an ethylene plant was prepared, except that the ethane and propane were replaced with methane to aid in the selectivity calculations. The feed stream contained approximately (all by weight unless otherwise noted): hydrogen 2.5%; methane 40%; ethylene 41%; propylene 15%; acetylene 3500 ppm; propadiene 1800 ppm; methylacetylene 1600 ppm; and carbon monoxide 230 ppm (by volume). The feed stream was introduced into the reactor at a flow rate of 900 mL per minute at 200 psig translating to a gas hourly space velocity of about 2700 hour-1. The reactor temperature was increased until the hydrogenation reaction ran away, i.e., the uncontrollable hydrogenation of ethylene was allowed to occur. The reactor was then allowed to cool to room temperature before data collection was started.

Feed at 900 mL/min and 200 psig was passed over the catalyst while holding the temperature constant before sampling the exit stream by gas chromatography. The catalyst temperature was determined by inserting a thermocouple into the thermowell and varying its position until the highest temperature was observed. The furnace was then raised a few degrees, and the testing cycle was repeated until 3 weight % of ethane was produced.

A sample of catalyst B was tested using the above protocol as well as a control sample (catalyst A), the results are presented in Table 2. The results indicate that catalyst B has a higher MAPD conversion and a higher ethylene selectivity than the control catalyst at the same reaction temperature. Furthermore catalyst B has a similar to higher acetylene conversion at the same temperatures.

TABLE 2

| Run # | catalyst | Acetylene conversion, % | MAPD conversion, % | Ethylene selectivity, % |
| --- | --- | --- | --- | --- |
| 401 (control) | A | T = 120 F.: 99.5<br>T = 130 F.: 100 | T = 120 F.: 66<br>T = 130 F.: 79 | T = 120 F.: 47<br>T = 130 F.: −6 |
| 402 (catalyst B) | B | T = 120 F.: 100<br>T = 130 F.: 100 | T = 120 F.: 71<br>T = 130 F.: 84 | T = 120 F.: 57<br>T = 130 F.: 3 |

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The disclosures of all patents, patent applications, and publications cited herein are hereby incorporated by reference, to the extent that they provide exemplary, procedural or other details supplementary to those set forth herein.

What is claimed is:

1. A method of selectively hydrogenating a highly unsaturated hydrocarbon to an unsaturated hydrocarbon comprising contacting in a reaction zone under hydrogenation conditions a feedstream comprising the highly unsaturated hydrocarbon with a selective hydrogenation catalyst composition having palladium and a chlorided catalyst support wherein the palladium has a skin thickness of from about 1 micron to about 3000 microns and, wherein a fouling rate of the selective hydrogenation catalyst is at least about 25 percent less than the fouling rate of an otherwise similar selective hydrogenation catalyst having a non-chlorided catalyst support under like hydrogenation conditions.

2. The method of claim 1, wherein the selective hydrogenation catalyst is produced by a process comprising:
contacting an inorganic catalyst support with a chlorine-containing compound to form the chlorided catalyst support;
subsequently removing at least some of the chlorine-containing compound from the chlorided catalyst support to form a clean chlorided catalyst support; and
subsequently adding palladium to the clean chlorided catalyst support to form a supported-palladium composition.

3. The method of claim 2 wherein the clean chlorided catalyst support comprises from about 5 ppm to about 2000 ppm chlorine.

4. The method of claim 1, wherein the feedstream is a product of a hydrocarbon cracking or pyrolysis process.

5. The method of claim 1, wherein the highly unsaturated hydrocarbon comprises acetylene, methylacetylene, propadiene, or combinations thereof.

6. The method of claim 1, wherein the feedstream further comprises carbon monoxide.

7. The method of claim 6, wherein the carbon monoxide is present in the feedstream in an amount of less than about 0.15 mole % based on the total moles of a fluid in the feedstream.

8. The method of claim 1, wherein the reaction zone has a temperature in the range of from about 5° C. to about 300° C.

9. The method of claim 1, wherein the reaction zone has a pressure in the range of from about 15 psig to about 2000 psig.

10. The method of claim 1, wherein the reaction zone is a component of a backend acetylene removal unit and the feedstream comprises hydrogen and acetylene.

11. The method of claim 10, wherein a mole ratio of hydrogen to acetylene is in the range of from about 0.1 to about 10.

12. The method of claim 1, wherein the reaction zone is a component of a frontend deethanizer acetylene removal unit, a frontend depropanizer acetylene removal unit, or a raw gas acetylene removal unit and the feedstream comprises hydrogen and acetylene.

13. The method of claim 12, wherein the mole ratio of hydrogen to acetylene is in the range of from about 10 to about 3000.

14. The method of claim 1, wherein the reaction zone is a component of a frontend depropanizer acetylene removal unit or raw gas acetylene removal unit and the feedstream comprises hydrogen and methylacetylene.

15. The method of claim 14, wherein the mole ratio of hydrogen to methylacetylene is in the range of from about 3 to about 3000.

16. The method of claim 1, wherein the reaction zone is component of a frontend depropanizer acetylene removal unit or raw gas acetylene removal unit and the feedstream comprises hydrogen and propadiene.

17. The method of claim 16, wherein the mole ratio of hydrogen to propadiene is in the range of from about 3 to about 3000.

18. The method of claim 1, further comprising recovering an effluent stream comprising ethylene and less than about 5 ppm of the highly unsaturated hydrocarbon.

19. The method of claim 1, further comprising recovering an effluent stream having about 90% less acetylene when compared to the amount of acetylene in the feedstream.

20. The method of claim 1, further comprising regenerating the selective hydrogenation catalyst.

21. The method of claim 20, wherein the selective hydrogenation catalyst is regenerated by a calcination in the presence of a gas comprising oxygen.

22. The method of claim 21, wherein the calcination is carried out at a temperature not in excess of 500° C.

23. The method of claim 1, wherein the lifetime of the selective hydrogenation catalyst is increased when compared to an otherwise similar selective hydrogenation catalyst having a non-chlorided catalyst support.

* * * * *